April 12, 1960 R. C. STIEFEL ET AL 2,932,816

KEYBOARD TRANSMITTER

Filed May 19, 1958 7 Sheets-Sheet 1

INVENTORS
R. C. Stiefel
W. Miller

BY Victor D. Borst
ATTORNEY

April 12, 1960 R. C. STIEFEL ET AL 2,932,816

KEYBOARD TRANSMITTER

Filed May 19, 1958

7 Sheets-Sheet 2

INVENTORS
R. C. Stiefel
W. Miller

BY Victor D. Borst Atty.

INVENTORS
R. C. Stiefel
W. Miller
BY
Victor D. Borst Atty.

April 12, 1960

R. C. STIEFEL ET AL 2,932,816

KEYBOARD TRANSMITTER

Filed May 19, 1958

7 Sheets-Sheet 4

INVENTORS
R. C. Stiefel
W. Miller

BY

Victor D. Borst Atty.

INVENTORS
R. C. Stiefel
W. Miller
BY
Victor D. Borst
ATTORNEY

INVENTORS
R. C. Stiefel
W. Miller
BY
Victor D. Borst Atty.

INVENTORS
R. C. Stiefel
W. Miller
By Victor D. Borst
ATTORNEY

United States Patent Office 2,932,816

Patented Apr. 12, 1960

2,932,816

KEYBOARD TRANSMITTER

Rudy C. Stiefel, New York, N.Y., and Wilbur Miller, Levittown, Pa., assignors to Sperry Rand Corporation, Ford Instrument Company Division, Long Island City, N.Y., a corporation of Delaware Application May 19, 1958, Serial No. 736,086

7 Claims. (Cl. 340—174)

This invention relates to a keyboard transmitter mechanism by which data is transmitted to a digital computer located at a station remote from the transmitter mechanism.

Data which is inserted into the mechanism in decimal form is converted into binary decimal form, and the parallel representation of the input is changed to serial form to permit flow of information to the computer over a single wire.

The mechanism consists generally of a keyboard comprising a plurality of similar spaced parallel decades each of which consists of ten aligned digits consecutively numbered from 0 to 9. As shown herein the mechanism is provided with eight decades, but the number of decades may be varied more or less in accordance with installation requirements and the particular use for which the mechanism is provided. Each decade comprises a printed circuit card and ten similar switches associated therewith, one for each digit; and each digit comprises a depressible key, connected to one of the decade switches, through which the connected switch is actuated.

Each decade circuit card is provided with four magnetic core storage and transmitter packages and a printed cricuit by which the magnetic core packages are electrically connected to input terminal contacts associated with the various switches and which are adapted to be connected by the switches to a power source in accordance with a selected digit. The switch mechanism converts the decimal form to the binary decimal form. The magnetic core packages are operative to automatically convert data imparted thereto in binary decimal parallel form to binary decimal serial form. The various decade circuits are all serially connected together by an interdecade printed card circuit connected to the output terminal contacts of the magnetic core packages. The interdecade circuit also connects a transistor power supply, which is energized by a 117 volt A.C. supply line, to the various decade circuits, to a subtract magnetic core package, and to a transistor driver which is connected through a transistor shaper to a computer, and directly to the first decade circuit. The last decade circuit is connected to the subtract magnetic core package through which the data imparted to the transmitter is transmitted in serial form over a single wire to the computer. A pair of normally open function switches, one of which is an "Add" switch and the other of which is a "Subtract" switch, are interposed in the line between the transistor power supply and the various decade circuits and the subtract magnetic core package. In this way none of the various circuits and magnetic core packages are energized until either the "Add" switch or the "Subtract" switch is closed, which is not done until the data to be transmitted to the computer has been imparted to the transmitter mechanism by depressing the appropriate keys in the various decades.

All of the key actuated switches are self-locking in depressed position, and the several switches of each decade are interlocked so that if an error is made in punching a key the release of the wrong switch and key will be automatic when the correct key is depressed. Means are also provided by which the entire keyboard is cleared for subsequent inputs of data by the closing of either the "Add" or the "Subtract" switch.

The principal object of the invention is to provide a simple, compact and efficient keyboard transmitter by which data is imparted to a remote computer.

Another object of the invention is to provide a transmitter of the aforesaid character having a plurality of decades in which printed card circuits are utilized for all decade and interdecade wiring.

Another object of the invention is to provide a transmitter of the aforesaid character in which magnetic cores are provided for storage of data before release for transmission and for converting input data from decimal form to binary decimal form and for changing data from parallel to serial form for one wire transmission to a computer.

Another object of the invention is to provide a transmitter of the aforesaid character having modular decade construction which permits the number of decades to be varied in accordance with different installation requirements.

Having stated the principal objects of the invention other and more limited objects thereof will be apparent from the following specification and the accompanying drawings forming a part thereof wherein.

Figures 5, 8:
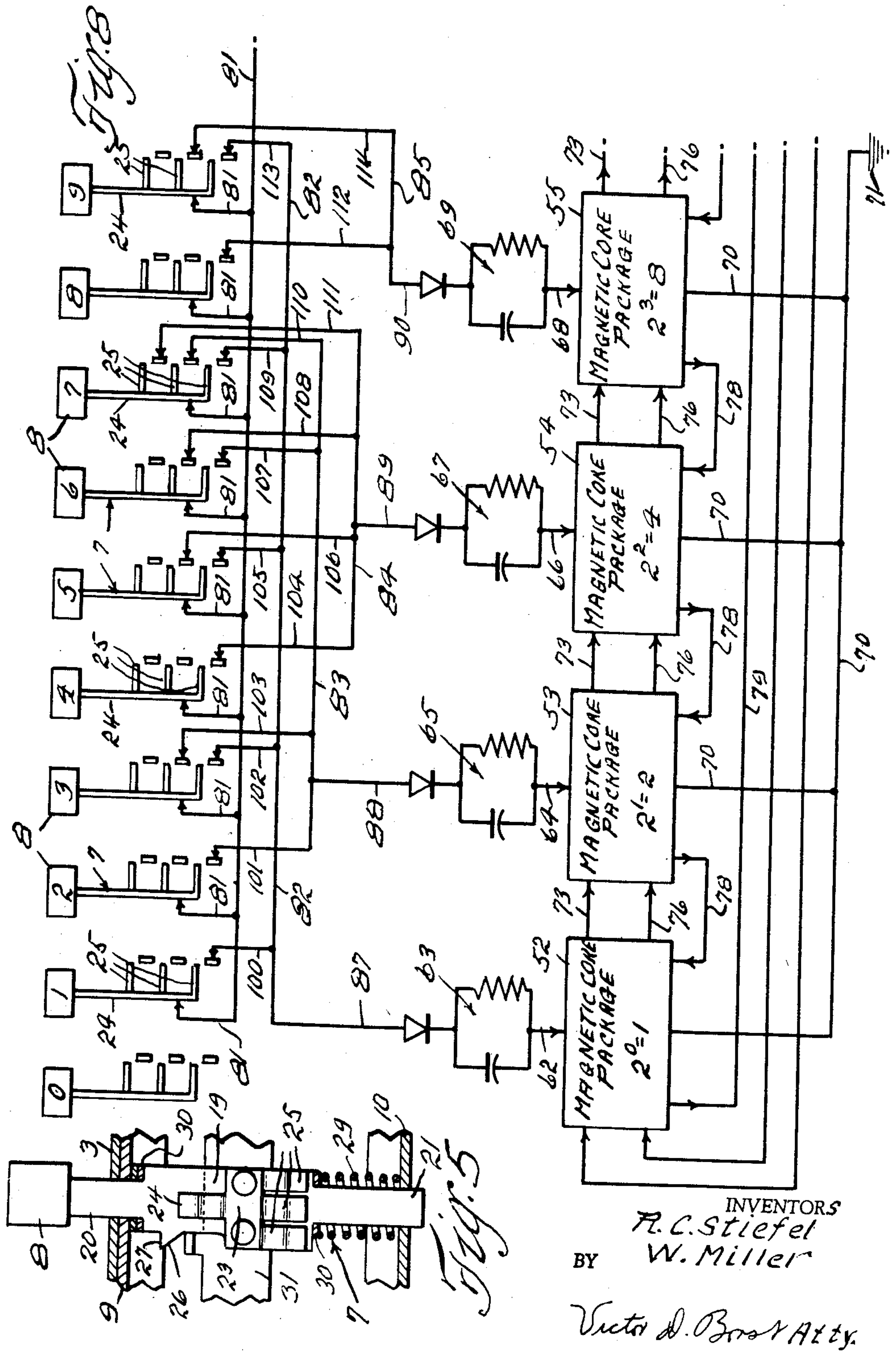
Fig. 5 is a detail view in front elevation of one of the several digit switches used in each of the plurality of decades.
Figure 9:
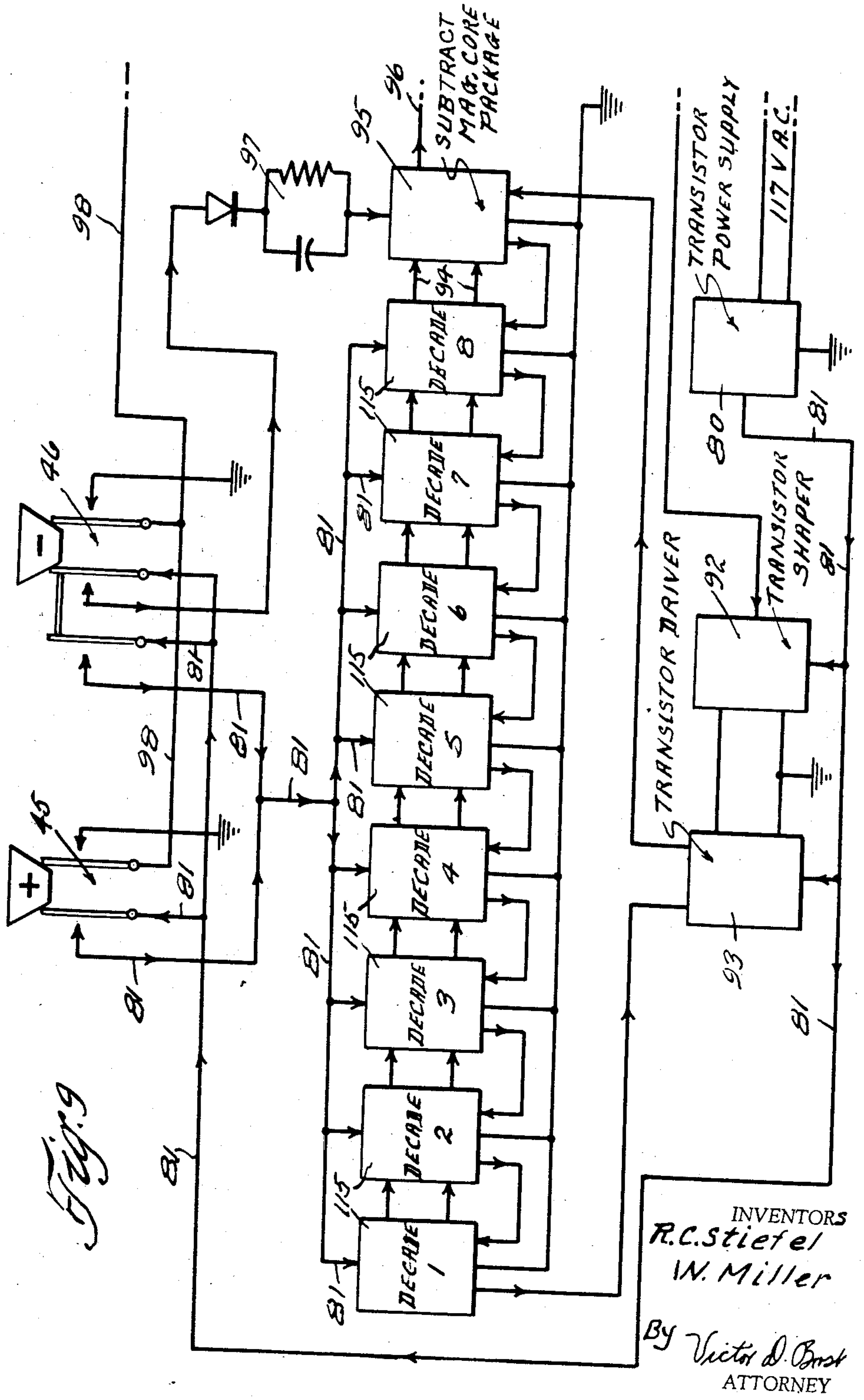

Fig. 8 is a block diagram showing the manner in which the various digit switches connect the source of D.C. voltage to the various magnetic core packages in accordance with the particular switch which is depressed to closed position; and Fig. 9 is a block diagram showing the manner in which the various decade circuits, the transistor power supply, the transistor driver, the transistor shaper, the subtract magnetic core package, and the computer are all connected together through the normally open "Add" and "Subtract" switches by the interdecade circuit.

Referring now to the drawings in detail by reference characters, the transmitter mechanism 1 comprises a casing 2, the open upper end of which is closed by a keyboard cover plate 3 having the downwardly extending peripheral flange 4 which telescopes the open upper end of the casing 2. A plurality of similar spaced parallel ten digit decades, generally indicated by the numeral 5, which are disposed within the casing 2, are permanently secured to the underside of the keyboard cover plate 3 for removal therewith as a single unit from the casing 2.

Each decade 5 comprises a printed circuit card 6 and ten digit switches 7 which are provided with actuating keys 8 consecutively numbered from 0 to 9. The card 6 is permanently secured along the upper edge thereof to a longitudinally extending bracket 9 which is permanently secured to the underside of the keyboard cover plate 3. A bracket 10 which is permanently secured to the card 6 is disposed in vertically spaced parallel relation to the bracket 9. The sides of the brackets 9 and 10, opposite the card 6, are connected together at the end thereof by vertically extending plates 11 and 12, parallel to the card 6, which are provided with inturned flanges 13 and 14, respectively. The lower end of the card 6 is provided with a short narrow extension 15 which is plugged into a connector 16 which is provided with a plurality of terminals 17 and is supported in fixed position by a pair of transversely extending spaced parallel U-shaped hangers 18 which are permanently secured to the underside of the keyboard cover plate 3.

Each of the digit switches 7 is formed from a thin flat metal plate and comprises a plunger having a body section 19 and the upwardly and downwardly extending stems 20 and 21, respectively. A block 22, of insulating material, which is secured to the front face of the switch body section 19, carries a contactor 23 having an upwardly extending spring finger 24 and three spaced similar parallel downwardly extending spring fingers 25. One edge of the body section 19, above the block 22, is provided with an upwardly and outwardly flaring cam surface 26 which terminates at the upper end thereof in a horizontally extending shoulder 27. The several switches 7 of the decade are slidably supported in spaced longitudinal alignment adjacent the rear face 28 of the card 6 by and between the brackets 9 and 10 with the spring contactor fingers 24 and 25 frictionally engaging the rear face 28, of the card 6. The upwardly extending switch stems 20, to which the keys 8 are removably secured, extend out through aligned complementary apertures in the bracket 9 and keyboard cover plate 3; and the downwardly extending stems 21 extend through complementary apertures in the bracket 10. The switches 7 are yieldingly biased upwardly to normal open position by coiled springs 29 which are disposed about the stems 21 between the bracket 10 and washers 30 disposed about the stems 30 at the junction of the stems 21 and body sections 19. The upward movement of the switches 7 is limited by washer pads 30, which are disposed about the stems 20 at the junctions thereof with the body sections 19, by their engagement with the underside of the bracket 9.

In order to lock a switch in depressed closed position there is provided a slidably mounted longitudinally extending bar 31 which is disposed rearwardly of the aligned row of switches, parallel thereto, and extends through complementary apertures in the inturned flanges 13 and 14 carried by the bracket connecting plates 11 and 12, respectively. The bar 31 carries a plurality of latching fingers 32, one for each switch 7, which extend forward from the bar 31 across the body section 19 of the switches just below the cam surfaces 26. One end of the bar 31 is turned inwardly as indicated at 33 for connection to a coiled tension spring 34 the other of which is connected to the adjacent flange 13. The springs 34 are provided to yieldingly hold the fingers 32 against the edges of the switch body sections 19. As a switch is depressed from normally open position to closed position by its key 8, the cam surface 26, by its engagement with the side of the finger 32, will shift the bar 31 outwardly against the tension of the spring 34 until the cam surface 26 has been moved out of engagement with the fingers 32 and the shoulder 27 is below the underside of the finger 32. As soon as this occurs the spring 34 will shift the bar back to initial position with the finger 32 in engagement with the edge of the section 19 and with the shoulder 27 disposed below the finger 32. Then when the key 8 is released the spring 29 will force the plunger upwardly until the shoulder 27 engages the underside of the finger 32 thereby locking the switch in depressed closed position. From this it will be apparent that the construction is such that any switch that has been locked in depressed closed position will be released for return to normal open position by the depressing of any other switch in the same decade to closed position. Therefore if a mistake is made by depressing the wrong key it will be automatically corrected by the depressing of the proper key.

In order to simultaneously release the locked closed switches in all of the decades after data has been transmitted to a computer, and thereby clear the entire keyboard for subsequent inputs, there is provided a transverse shaft 40 which extends across all of the bars 31 of the various decades and is rotatably supported by bearing brackets 41 which are secured to and extend downwardly from the keyboard plate 3. The shaft 40 has a plurality of cams 42 pinned thereon, one for each bar 31, which are adapted to engage and simultaneously shift all of the bars 31 against the resistance of the springs 34 upon rotation of the shaft. The shaft 42 also has a horizontally extending arm 43 pinned thereon, adjacent one end thereof, which is operatively connected by actuating means 44 to a pair of normally open function switches 45 and 46. The closing of either of the switches 45 or 46 will through the actuating means 44 depress the free end of the arm 43 thereby rocking the shaft 40 which causes the cams 42 to simultaneously shift all of the decade bars 31 a sufficient distance to release all of the locked switches. As soon as the actuated function switch is released the springs 34 will return the bars 31 and the shaft 40 back to normal at rest position.

Each card 6 has a circuit 50 printed on the front face 51 thereof and four magnetic core storage and transmitter packages 52, 53, 54 and 55 are secured to the rear face 28 thereof. The magnetic core receiver packages 52 to 55 are connected into the circuit 50 through terminals 56 which extend through complementary apertures in the card 6.

The printed card circuits of the various decades are all electrically connected together by a card 65, having an appropriate interdecade circuit printed thereon, which is connected to the several terminals 17 in each of the connectors 16 and to a power source.

Figure 1:
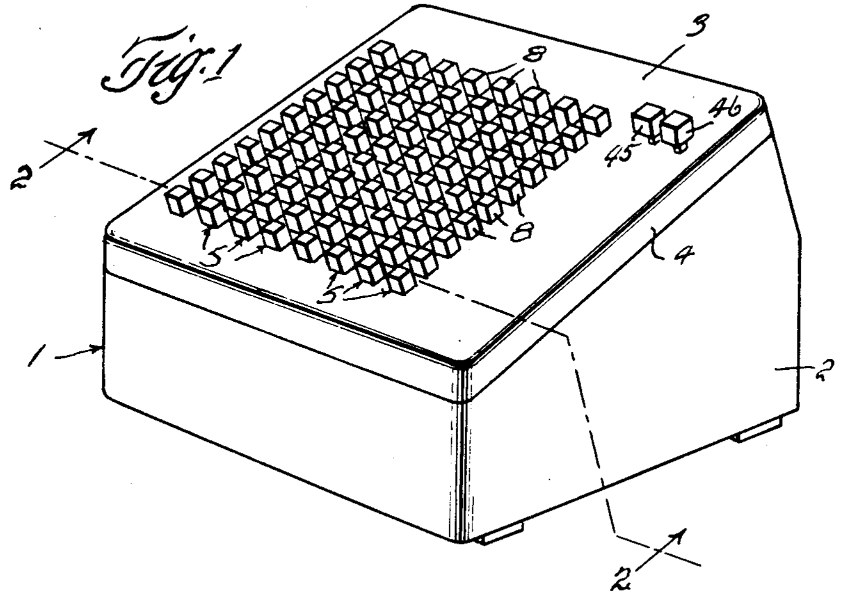
Fig. 1 is a perspective view of a keyboard transmitter mechanism, constructed according to our invention, for transmitting data to a remote computer.
Figure 6:
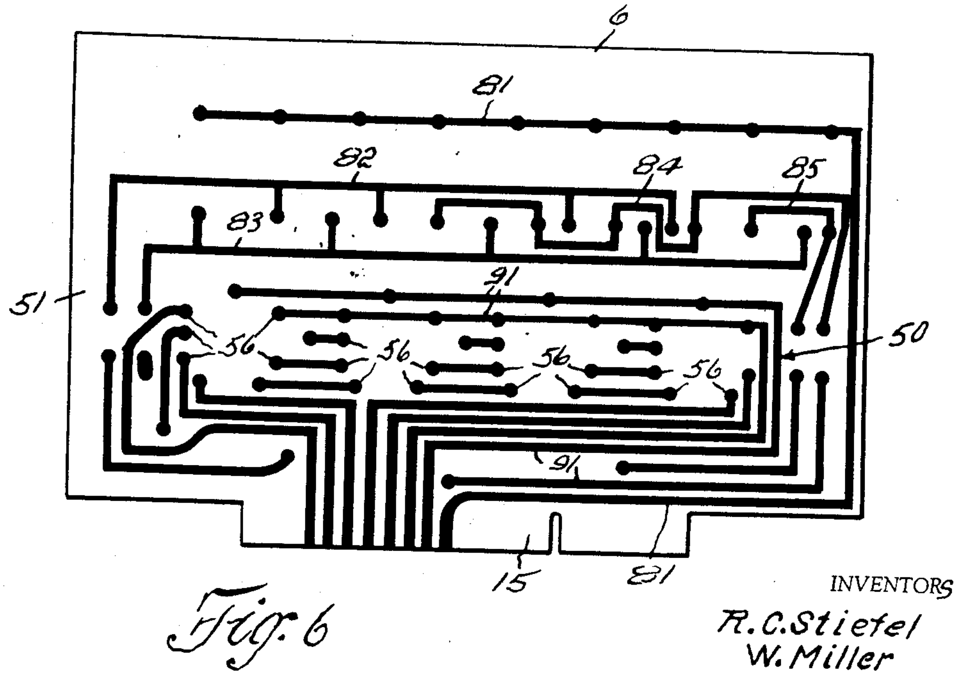
Fig. 6 is a face view of one of the similar printed circuit cards used in each decade and showing the printed circuit and contacts thereon.
Figure 2:
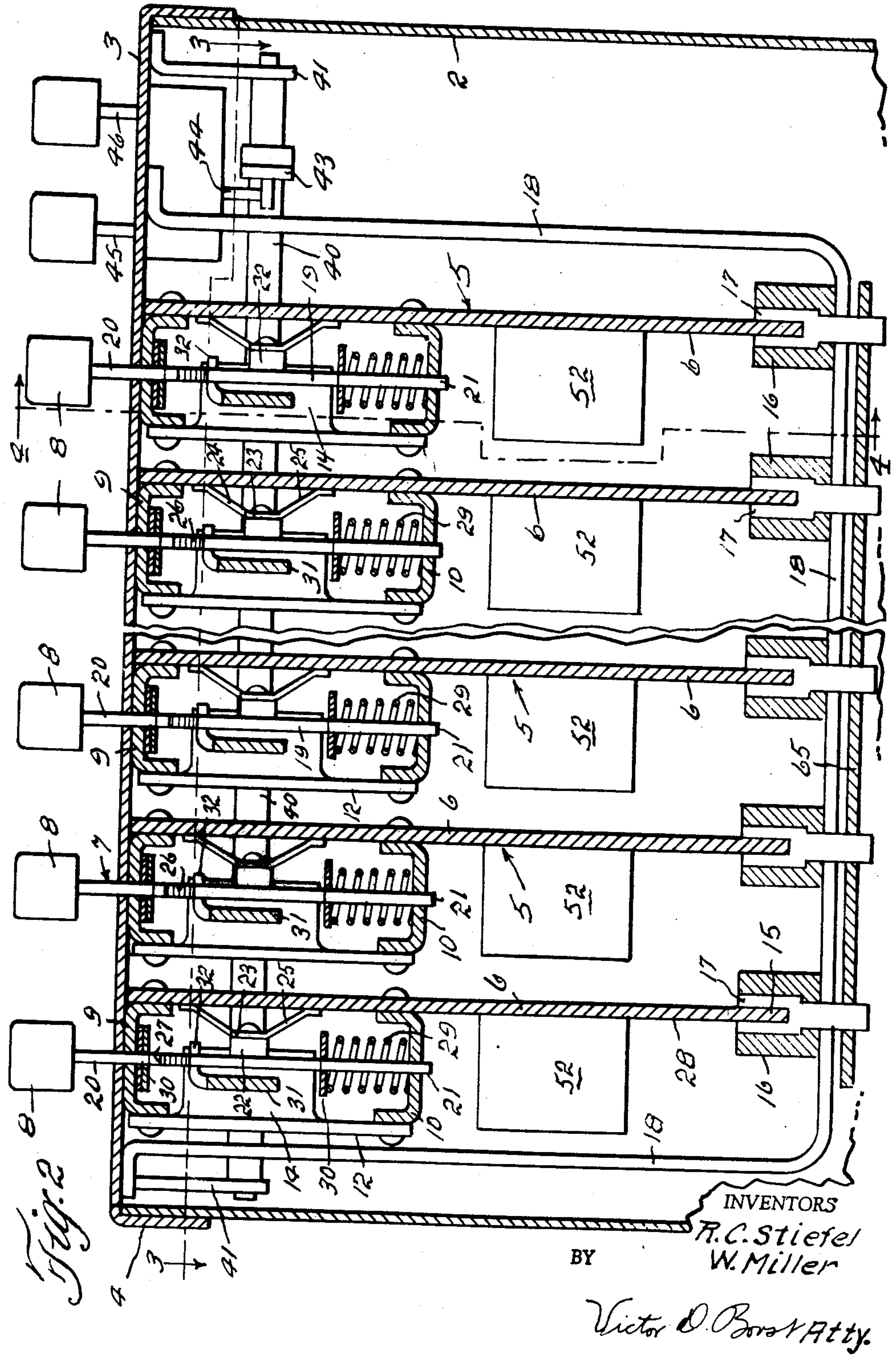
Fig. 2 is a vertical transverse sectional view taken substantially on the line 2—2 of Fig. 1 from side to side of the mechanism.
Figure 3:
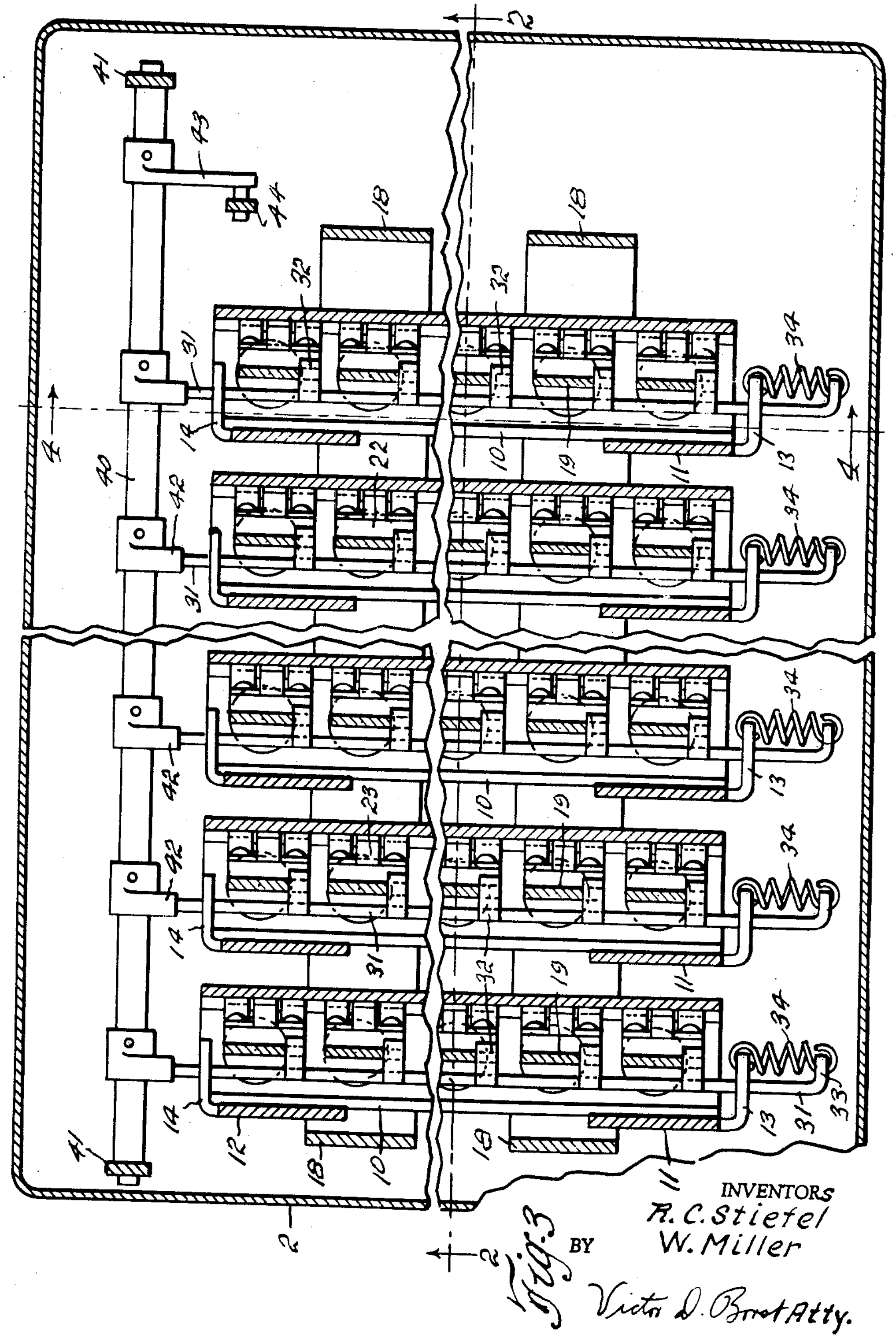
Fig. 3 is a horizontal section taken substantially on the line 3—3 of Fig. 2.
Figure 4:
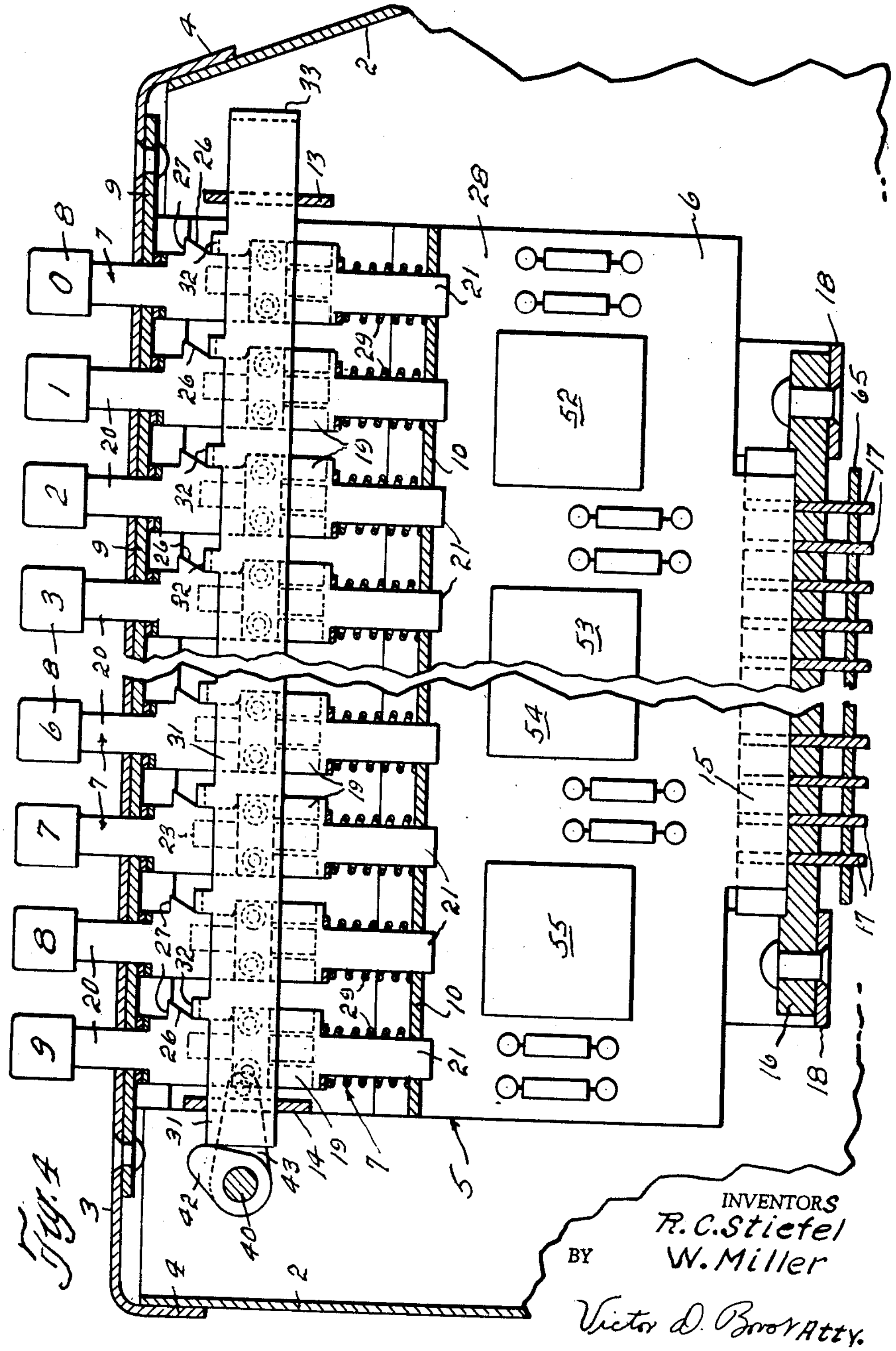
Fig. 4 is a longitudinal vertical section taken substantially on the line 4—4 of Figs. 2 and 3 from front to rear of the mechanism.
Figure 7:
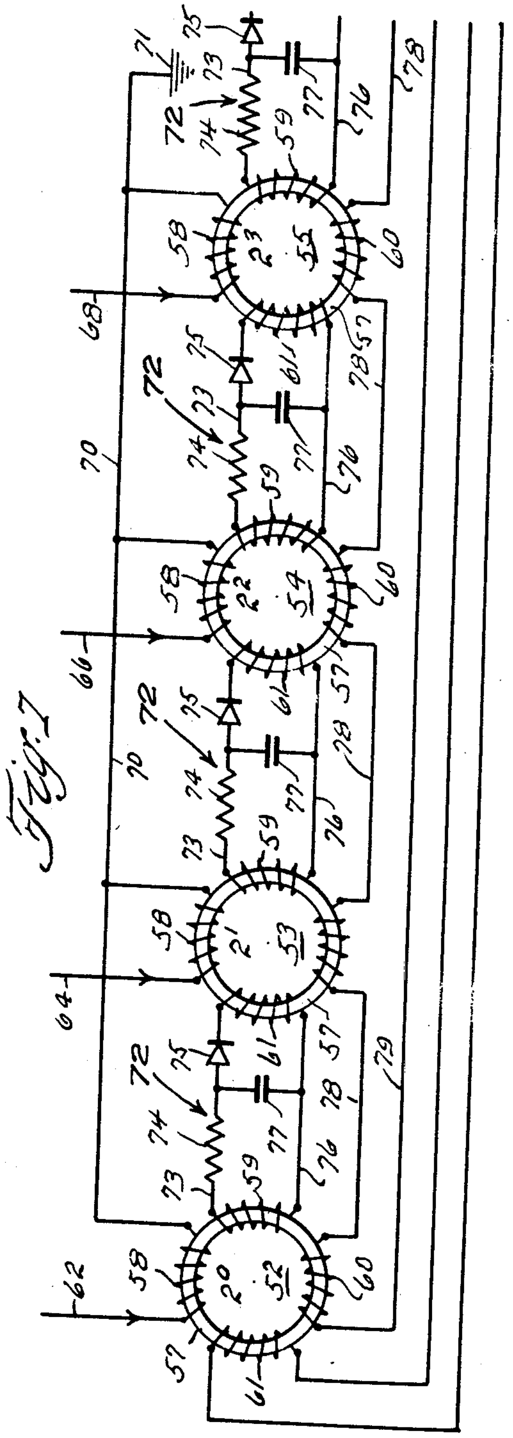
Fig. 7 is a diagrammatic layout illustrating the construction of the serially connected magnetic core storage and transmitting packages of the first decade.
Figure 7A:
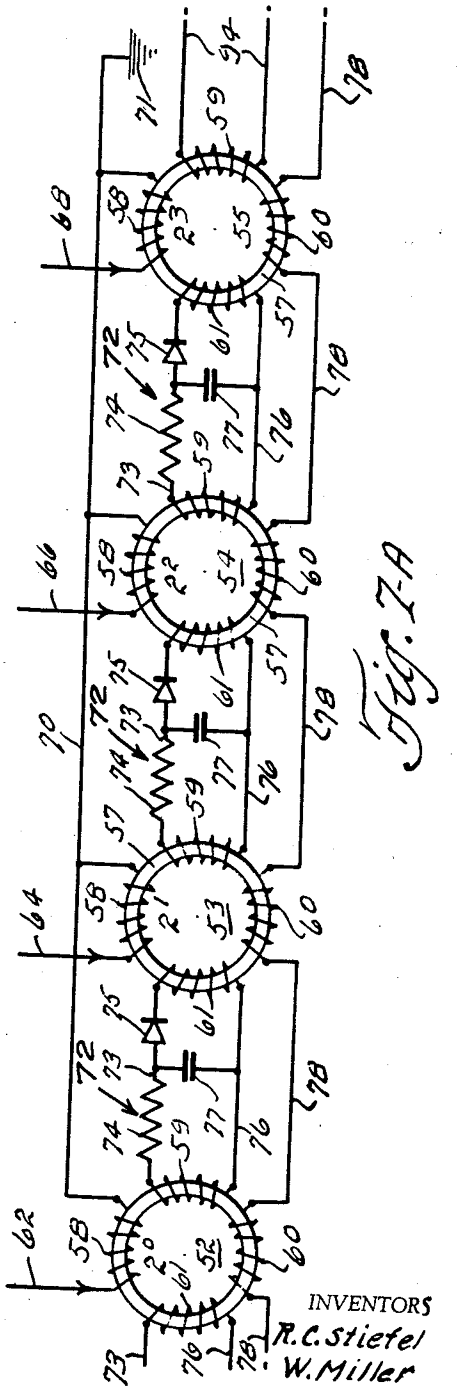
Fig. 7A is a similar view of the last decade, it being understood that the other decades are similarly serially connected therebetween.

As shown in Fig. 7, each magnetic core receiver and transmitter package 52 to 55, comprises a ring shaped soft iron core 57 having an input winding 58, an output winding 59, a shift or control winding 60, and a serial input winding 61 thereon. The serial input winding 61 of the package 52 of the first or unit decade is connected to the computer. One end of the input winding 58 of the package 52 is connected by a conductor 62 to an RC network 63; the input winding 58 of the package 53 is connected by a conductor 64 to a similar RC network 65; the input winding 58 of the package 54 is connected by a conductor 66 to a similar RC network 67, and the input winding 58 of the package 55 is connected by a conductor 68 to a similar RC network 69. The other ends of all of the input windings 58 are connected by a conductor 70 to a common ground 71.

The output winding 59 of the package 52 is connected by a delay circuit 72 to the serial input winding 61 of the package 53; the output winding 59 of the package 53 is connected by a delay circuit 72 to the serial input winding 61 of the package 54; the output winding 59 of the package 54 is connected by a delay circuit 72 to the serial input winding 61 of the package 55, and the output winding 59 of the package 55 is connected by a delay circuit 72 to the serial input winding 61 of the package 52 of the next succeeding decade. The delay circuits 72 are all identical and each comprises a conductor 73, having a resistor 74 and a rectifier 75 interposed therein, by which one end of the windings 59 and 61 are connected together, and a conductor 76 by which the other ends of the windings 59 and 61 are connected together. A capacitor 77 is connected across the conductors 73 and 76 between the resistor 74 and the rectifier 75. The shift or control windings 60 are all serially connected together and to the computer by the conductors 78 and 79 through the decade circuits and the interdecade circuit. The magnetic core storage and transmitter packages 52 to 55 of the various decades are all similarly connected together.

As previously stated, the parallel decimal inputs imparted by depressing the requisite keys of the various decades are first converted to binary decimal parallel form by the switch contacts 7 and then converted to binary decimal serial form by the magnetic core packages 52 to 55 as it is read out of the core packages to the computer. In the package 52, "1" is converted to $2^0$ which equals "1"; in package 53 "2" is converted to $2^1$ which equals "2"; in package 54 "4" is converted to $2^2$ which equals "4", and in package 55, "8" is converted to $2^3$ which equals "8."

The RC circuits 63, 65, 67 and 69, and consequently the input winding 58 of the magnetic core packages 52 to 55, are connected to a transistor power source 80, which is energized by an 117 v. A.C. line, through the function switches 45 and 46 and the decade switches 7 by conductor 81 which constitutes part of the printed card circuit 50. The switches 7 are adapted to connect the conductor 81 to leads 82, 83, 84 and 85, having contact terminals which extend through complementary apertures from the front surfaces 51 of the card 6 to the rear surfaces 28 thereof, and by conductors 87, 88, 89 and 90 to the RC networks 63 to 69. The various other conductors 91 of the printed circuits 50 are adapted to connect the various decade circuits together and to a computer as previously described. The transistor power source 80, a transistor shaper 92, and a transistor driver 93 are also connected to the various decade circuits 50 and to a computer through the function switches 45 and 46, and the output of the various decade circuits 50 is delivered through conductors 94 to a subtract magnetic core package 95 which is connected to the computer by a single lead 96. The transistor power supply 80 is also connected through the function switches 45 and 46 to the subtract magnetic core package 95 through an RC network 97, and to the computer through a "request" conductor 98.

The manner in which the switches 7 of each decade connect the power source 80 to the input windings 58 of the binary decimal magnetic core packages 52 to 55 of the various decades will now be explained in connection with Fig. 8, by tracing the connection between the conductor 81, through each switch 7 of a single decade, and the magnetic core packages 52 to 55 through the leads 87 to 90, the RC networks 63 to 69 and the conductors 62 to 68, respectively. The operation of each digit switch 7, of each decade numbered 1 to 9, inclusive, will be successively explained, it being understood that the finger 24 of the contactor 23 of each digit switch 7 makes contact with the conductor 81, whenever a digit switch 7 is depressed from normal open position to closed position by the depressing of its associated key 8.

When a number "1" key is depressed, its switch 7, through a lead 100, connects the power input conductor 81 to the conductor 82 which through the conductor 87, RC network 63 and conductor 62 connects it to the input winding 58 of the "one" package 52. In this way, only the package 52 of a decade is connected to the power source by the number "1" key thereof. When a number "2" is depressed, its switch 7, through a lead 101, connects the power input conductor 81 to the conductor 83, which through the conductor 88, RC network 65 and conductor 64 connects it to the input winding 58 of the package 53. In this way only the "two" package 53 of a decade is connected to the power source by the number "2" key thereof. When a number "3" key is depressed, its switch 7, through a lead 102, connects the input conductor 81 to the conductor 82 for the "one" package 52, and through a lead 103 to the conductor 83 for the "two" package 53. It will therefore be seen that the number "3" key and switch of a decade connects both the "one" package 52 and the "two" package 53 thereof to the power source. When the number "4" key of a decade is depressed its switch 7 through a lead 104 connects the conductor 81 to the conductor 84, which through the conductor 89, RC network 67 and conductor 66 connects it to the input winding 58 of the "four" package 54. Therefore only the "four" package 54 of a decade is connected to the power source by the number "4" key thereof. When the number "5" key of a decade is depressed, its switch 7, through a lead 105, connects the input conductor 81 to the conductor 82 for the "one" package 52, and through a lead 106 to the conductor 84 for the "four" package 54. The number "5" key and switch of a decade therefor connects both the "one" package 52 and the "four" package 54 thereof to power. When the number "6" key of a decade is depressed its switch 7, through a lead 107 connects the input conductor 81 to the conductor 83 for the "two" package 53, and through a lead 108 to the conductor 84 for the "four" package 54. Both the "two" package 53 and the "four" package 54 of a decade are connected to power by the number "6" key and switch thereof. When the number "7" key of a decade is depressed, its switch 7 through leads 109, 110 and 111 connects the input conductor 81 to the conductors 82, 83 and 84 for the packages 52, 53 and 54, respectively. Therefore the "one" package 52, the "two" package 53 and the "four" package 54 of a decade are all connected to power by the number "7" key thereof. When the number "8" key of a decade is depressed the switch 7 thereof, through a lead 112, connects the power input conductor 81 to the conductor 85, which through the conductor 90, RC network 69 and conductor 68 connects it to the input winding 58 of the "eight" package 55. Only the "eight" package 55 of a decade is connected to power by the number "8" key and switch thereof. And when the number "9" key of a decade is depressed, its switch 7 through a lead 113 connects the conductor 81 to the conductor 82 for the "one" package 52, and through a lead 114 to the conductor 85 for the "eight" package 55. The "one" package 52 and the "eight" package 55 of a decade are therefore connected to power by the number "9" key thereof.

Fig. 9 diagrammatically illustrates the manner in which the various decades are all electrically connected together and to the transistor power supply 80 through the "Add" and "Subtract" function switches 45 and 46, it being understood that each block 115 represents a complete decade as previously described in connection with Figs. 7 and 8. Fig. 9 also shows the various electrical connections between the computer, and the transmitter mechanism 1.

The claims of this application are being restricted to the mechanical construction and operation of the transmitter mechanism 1 as shown in Figs. 1 to 6, inclusive. Consequently, the various electrical circuits as shown in Figs. 7 to 9 are not being shown and described in more detail herein, as it is believed that they have been sufficiently disclosed to illustrate the construction, operation and utility of the transmitter mechanism 1.

In operation, the appropriate keys of the various decades are depressed in accordance with the particular data to be transmitted to the computer. As each key is depressed, its switch 7 is automatically locked in depressed closed position, but as yet there is no current flowing to and through the switches 7 to the magnetic core storage and transmitter packages 52 to 55 of the various decades. After all of the keys have been depressed, one of the normally open function switches 45 or 46, depending on whether the data is to be added or subtracted by the computer, is manually closed. The closing of a function switch connects the entire mechanism to the power source and to the computer upon which the data imparted to the transmitter mechanism in parallel decimal form is automatically transmitted to the computer in binary decimal serial form. The closing of a function switch also releases all of the locked closed key switches 7 which then automatically return to normal open position, thereby clearing the entire keyboard for the next transmission of data.

From the foregoing, it will be apparent to those skilled in this art that we have provided a very efficient and relatively simple, small and compact, mechanism for accomplishing the objects of the invention.

It is to be understood that we are not limited to the specific construction shown and described herein, as various modifications may be made therein within the spirit of the invention and the scope of the appended claims.

What is claimed is:

1. A keyboard transmitter mechanism of the character described comprising a source of D.C. voltage, a casing having a plurality of similar multi-digit decades mounted therein; each decade comprising a card having a plurality of magnetic core storage and transmitter packages mounted thereon, a plurality of similar key actuated digit switches one for each decade digit operatively associated with said card, a printed circuit on said card having input contacts associated with said switches and through which said source of D.C. voltage is connected to selected magnetic core packages in accordance with the particular digit switch actuated, said printed circuit also having a plurality of other contacts connected to said magnetic core receiver packages by said printed circuit, and a connector having a plurality of terminals into which said card is plugged with said other contacts in engagement with said terminals; and a printed circuit card by which the terminals of one decade connector are connected to the terminals of the other decade connectors and to a transmitter circuit by which pulses from said magnetic core packages are imparted to a computer.

2. A keyboard transmitter mechanism of the character described comprising a casing open at the upper end thereof, a removable keyboard plate by which the upper end of said casing is closed, a source of D.C. voltage, a plurality of similar ten digit decades disposed within said housing and secured to said keyboard plate for removal therewith as a single unit from said housing; each decade comprising a card having a circuit printed thereon, a plurality of magnetic core storage and transmitter packages mounted on said card and connected into said printed circuit, a pair of opposed parallel longitudinally extending brackets one of which is secured to said card along the upper edge thereof and to the underside of said keyboard plate and the other of which is secured to said card in vertically spaced relation below said one of said brackets, a plurality of aligned vertically disposed normally open digit switches, one for each decade digit, depressibly supported by and between said brackets with the stems thereof extending out through apertures in said keyboard plate and having keys secured to the upper end thereof, locking means for each of said switches by which said switches are held in depressed position, spring means by which said switches are returned to initial position when released by said locking means, interlocking means between said switches by which a locked switch is released by the depressing of another switch in said decade, said printed circuit having a plurality of input contacts associated with said switches through which said source of D.C. voltage is connected to said magnetic core packages by the closing of said switches, a plurality of other contacts in said printed circuit, and a connector having a plurality of terminals into which said card is plugged with said other contacts in engagement with said terminals; a printed circuit card by which the terminals of one decade connector are connected to the terminals of the other decade connectors and to a transmitter circuit interposed between said printed circuit and a remote computer, a pair of normally open function switches interposed between said source of D.C. voltage and said digit switches.

3. A keyboard transmitter mechanism as defined in claim 2, in which releasing means are so provided by which the depressed locked closed switches in all decades are simultaneously released for return to normal open position by the closing of one of said function switches.

4. A keyboard transmitter mechanism as defined in claim 2, in which said digit switch locking and interlocking means comprises a spring biased longitudinally slidable bar operatively associated with said digit switches, a plurality of locking fingers carried by said bar and extending outwardly therefrom transversely of said switches with one of said fingers disposed closely adjacent each of said digit switches, a shoulder carried by each of said digit switches which is adapted to be received under the associated finger when a switch is depressed to thereby lock said depressed switch in depressed closed position, a cam surface carried by each of said switches which is adapted to engage the associated finger during the depressing of a switch and shift said bar against the bias of said spring until said shoulder is below said finger, at which time said cam surface is out of engagement with said finger and said spring shifts said bar back to initial position with the said finger disposed in locking position over the said shoulder carried by said depressed switch.

5. A keyboard transmitter mechanism as defined in claim 4, in which said digit switch locking and interlocking means comprises a spring biased longitudinally slidable bar operatively associated with said digit switches, a plurality of locking fingers carried by said bar and extending outwardly therefrom transversely of said switches with one of said fingers disposed closely adjacent each of said digit switches, a shoulder carried by each of said digit switches which is adapted to be received under the associated finger when a switch is depressed to thereby lock said depressed switch in depressed closed position, a cam surface carried by each of said switches which is adapted to engage the associated finger during the depressing of a switch and shift said bar against the bias of said spring until said shoulder is below said finger, at which time said cam surface is out of engagement with said finger and said spring shifts said bar back to initial position with the said finger disposed in locking position over the said shoulder carried by said depressed switch, and in which releasing means are also provided by which the depressed locked closed digit switches in all decades are simultaneously released for return to normal open position by the closing of one of said function switches.

6. A keyboard transmitter mechanism as defined in claim 5, in which said releasing means comprises a shaft disposed transversely of said slidable bars, a plurality of cams carried by said shaft one of which is operatively associated with each of said bars, said cams being operative to simultaneously shift each of said bars against the bias of said springs upon the rotation of said shaft and operative connecting means between said shaft and said function switches by which said shaft is rotated by the closing of one of said function switches.

7. A keyboard transmitter mechanism as defined in claim 1, in which a pair of normally open function switches by which the operation of said mechanism is controlled are interposed between said source of D.C. voltage and said digit switches.

References Cited in the file of this patent

UNITED STATES PATENTS

| | | |
|---|---|---|
| 2,652,501 | Wilson | Sept. 15, 1953 |
| 2,814,031 | Davis | Nov. 19, 1957 |
| 2,856,130 | Woodward et al. | Oct. 14, 1958 |